March 24, 1970     L. R. BOSCH     3,501,880
CAPTIVE-COLUMN STRUCTURE
Filed Nov. 8, 1967
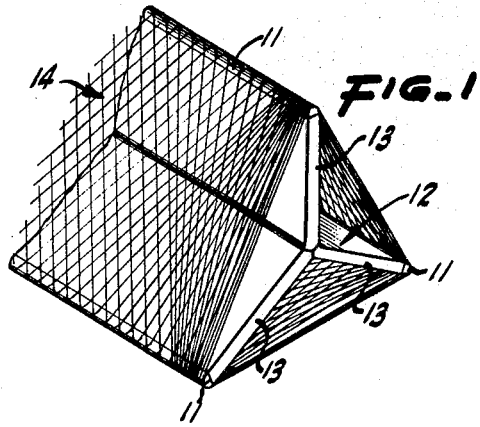
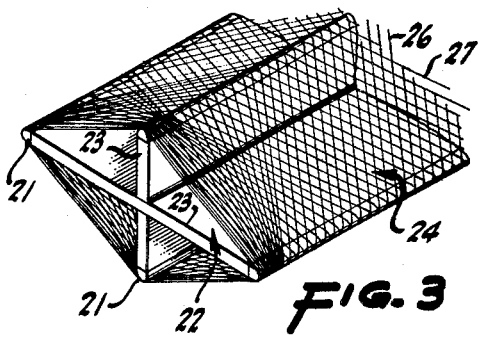
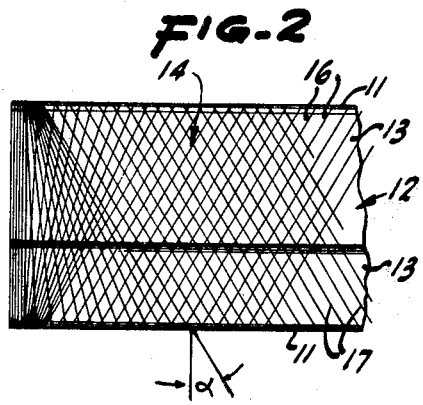
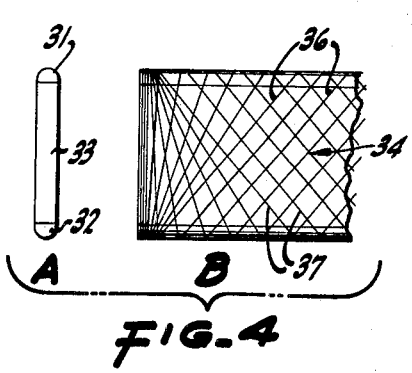
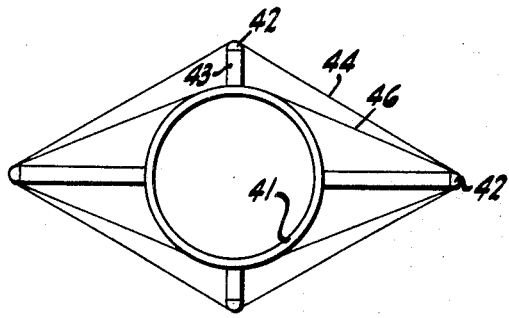
INVENTOR.
LAWRENCE R. BOSCH
BY
Lippincott, Ralls & Hendrickson
ATTORNEYS

United States Patent Office 3,501,880
Patented Mar. 24, 1970

3,501,880
CAPTIVE-COLUMN STRUCTURE
Lawrence R. Bosch, 2768 Georgetown St.,
East Palo Alto, Calif. 94303
Filed Nov. 8, 1967, Ser. No. 681,535
Int. Cl. E04c 3/10, 3/30
U.S. Cl. 52—222                                    11 Claims

ABSTRACT OF THE DISCLOSURE

The present invention is directed to a composite structural member formed of three or more columns restrained from moving in any direction relative to each other. The structure incorporates, in addition to the aforementioned columns, an internal compression core supporting the columns along the entire length thereof and a tension skin, or winding, disposed about the columns as the exterior of the structure. Substantially all types of loading of the structure of the present invention result in the application of only compression and tension forces to components of the structure which are particularly designed to withstand such forces.

BACKGROUND OF THE INVENTION

In the design of structural members the primary criteria is naturally the ability thereof to withstand the type of loading to be experienced. Various other factors such as cost, ease of use and the like are also of importance. A further factor of major importance for many applications is the strength-to-weight ratio. A high strength-to-weight ratio reduces the loading on the element itself and the loading upon other elements associated therewith so as to be important in all applications. In the field of aircraft structures, for example, it is obviously necessary to minimize weight while maximizing strength, and in substantially all applications wherein elements or structures are either portable or need to be moved, in part or whole, the strength-to-weight ratio is highly important. The present invention is particularly directed to maximizing strength-to-weight ratios.

It is recognized that many structural members have been developed which exhibit remarkable strengths under particular types of loading. Thus, for example, honeycomb structures are well known to have very high strength-to-weight ratios for particular applications; and various types of beams formed of light-weight metals, for example, are also highly advanced in this respect. It is, however, equally well recognized that structures of these types are normally intended for limited application in that they have very limited strengths for loadings other than those for which they are designed. Many structural members which exhibit very high strengths and strength-to-weight ratios are totally unsuited to the application of bending or torsional forces. The present invention provides a structural member having a very high strength for substantially all types of loading.

SUMMARY OF THE INVENTION

The captive-column structure of the present invention comprises a plurality of elongated columns fully constrained so as to be prevented from moving relative to each other. In addition to the individual columns of the structure, the invention includes a radial compression core comprising a rib, or the like, engaging each column over the length thereof along the inner side of the column with these ribs meeting at a common juncture and adapted to withstand compressive forces, so that the columns cannot move inwardly of the structure. The third component of the invention is a helically wound tension skin about the columns and secured thereto. The columns of the structure will therefore be seen to be fully constrained so as to be prevented from any substantial movement relative to each other or relative to other components of the overall structure, at least within the elastic limits of individual components.

The present invention provides for the utilization of maximum strength capabilities of the separate elements of the overall structure. It will be seen that the cross-sectional rigidity of the structure is determined by the compressive strength of the core in column cross section, as well as the tensile strength of the winding about these elements. It is to be particularly noted that shear forces and torsional forces which may act upon the structure of the present invention are resolved into tensile and compressive forces in the structure. Insofar as the individual columns of the structure are concerned, it is possible to liken same to driven piles wherein such piles are constrained from any type of lateral movement so that they are capable of carrying very substantial loads without the danger of buckling.

The present invention is capable of a wide variety of alternative configurations and applications, but for the purposes of clarity there is only described herein the basic structure of the invention with certain indications of possible variations. Consequently it is not intended to limit the invention to the details of description or illustration and, instead, attention is directed to the above-noted and below-described basic components of the invention and their interrelation.

DESCRIPTION OF FIGURES

FIGURE 1 is a schematic prospective illustration of a portion of a structure in accordance with the present invention;

FIGURE 2 is a side elevational view of an embodiment of the present invention and illustrating the oppositely wound tension elements of the structure;

FIGURE 3 is a partial prospective illustration of an embodiment of the present invention incorporating a compression-core unit having four ribs;

FIGURE 4A and B are end and side elevations, respectively, of a reinforced rib structure which may be employed, for example, as a portion of the core element of the present invention;

FIGURE 5 is an end view of an alternative embodiment of the present invention incorporating a tubular member as a portion of the core unit of the structure; and FIGURE 6 is a side elevational view of a structure formed in accordance with the present invention and having a varying cross section.

DESCRIPTION OF PREFERRED EMBODIMENTS

In FIGURE 1 of the drawings there are illustrated the basic elements or components of the present invention; in the following description these elements are separately treated as to individual characteristics and requirements, as well as being considered in overall combination to form the structure of the invention. Referring to FIGURE 1, there will be seen to be provided a plurality of elongated columns 11, preferably formed of uniform cross section and disposed in fixed relationship to each other. In order to achieve a three-dimensional structure, it is necessary to provide at least three columns, although reference is made to subsequent description of a two-column unit as illustrated in FIGURE 4. The columns 11 are adapted to undergo both compressive and tensile loading with the degree thereof depending upon loading of the overall structure. Thus, for example, if the structure is intended only to carry an end load, the individual columns would thus only undergo compressive loading lengthwise thereof; however, other applications of the present invention, such as bridges, beams and the like, would involve both tension and compression loading of these columns. Consequently the individual columns are designed for the particular application to which the invention is to be placed.

The interior of the structure hereof comprises a compression core unit 12 formed of a plurality of ribs 13. There is provided one rib element for each column of the structure, and thus in the embodiment of FIGURE 1 there are shown to be provided three ribs with each rib continuously contacting a separate column over the length thereof and the ribs all being joined together to extend outwardly from a common contact. This core unit 12 provides continuous support for the columns 11 to prevent them from buckling inward toward the center of the structure. The ribs of the core undergo substantially only compression loading radially inward of the core. It is to be noted that the structure is normally formed with the ribs having a much greater dimension longitudinally of the structure than radially thereof, or, in other words, the length of the individual ribs is substantially greater than the width. Inasmuch as the core element is intended to withstand compressive forces acting inwardly thereon, the individual ribs are so dimensioned as to withstand in excess of the expected compression loading, and in this respect it is noted that the ribs may be thickened between edges thereof to maximize resistance of the ribs to buckling. With regard to the joinder of the ribs, it is noted that they should make good and equal contact with the other ribs of the core and thus for a three-element core, such as shown in FIGURE 1, each of the ribs would preferably be formed with a V-edge along the center of the core structure, so that the three ribs would fit together for equal transfer of forces between the ribs. In addition, it is noted that the ribs should be joined together, as by the use of appropriate adhesives or other joinder means, depending upon the type of material from which the core is formed. At the outer edges of the core the columns are secured to the rib edges, again by appropriate joinder means depending upon the type of materials employed for column and core.

It will be seen that with the columns and core, as described above, these columns are prevented from moving toward each other by engagement with the compression core unit. The third basic element of the present invention is a tension-skin element, or filament winding, 14 wound in tension about the columns 11. The skin element 14, as it is hereinafter denominated, is provided in filament form oriented in spiral fashion with approximately one-half of the filament spiraling in one direction along the structure and the other half spiraling in the opposite direction along the structure. The filament winding of the skin may be formed of a variety of high-tension materials such as fiberglass, wires, steel strap, etc., and the windings of the skin element are placed about the columns in tension or, at least do not have any slack in original condition of application. In FIGURES 1 and 2 there are illustrated the two separate windings 16 and 17 of the skin; however, the winding turns are separated for clarity of illustration. It will be seen that this skin element serves to prevent movement of the columns away from each other and to firmly hold the columns against the compression core unit, so as to thus constrain the columns from movement toward or away from each other. Final constraint upon column movement is provided by firmly affixing the skin element 14 to the columns, again by the use of appropriate joinder means determined by the materials of the skin and columns.

The tension-skin element 14 functions only in tension and with the above-described two-oppositely-wound filaments of the skin, it will be appreciated that the skin actually operates somewhat in the manner of two opposed springs. For most applications, the skin windings are placed sufficiently close together to form a solid skin which may, in fact, be waterproofed, if desired. With a structural element of uniform cross section between the ends thereof, the helix angle, or filament pitch of the skin windings will be substantially uniform over the length of the element except at the ends thereof, as illustrated. Various degrees of pitch may be employed; however, it is preferred that the pitch angle lie in the range of 30° to 60° and, for most applications, a pitch angle of 45° is preferable.

It is of interest to note an example of the structure formed in accordance with the present invention from commonly available materials normally considered to have relatively low structural strengths. This example is in no way intended to be limiting, but, instead, is presented only as a further illustration of the invention to illustrate the high strength-to-weight ratio attainable herewith. The columns 11 may be formed of wood having the grain running longitudinally thereof, as for example Douglas fir. The core structure, on the other hand, may be formed of a light weight wood having the grain running radially of the ribs between the contiguous column and rib joinder. It is possible to form these ribs of balsa wood, for example, for even this material has a substantial compressive strength longitudinally of the grain. Wound about this wooden core and columns is the tension skin 14 which may, for example, be formed of fiberglass filament comprised of two windings of opposite pitch, with the turns of the windings preferably contiguous and suitable bonding, such as a resin or the like, being employed to affix the skin to the columns and also the turns of the windings to each other, if desired. An appropriate glue of high strength may be used to join the ribs of the core element together and to the columns, and the completed structure so formed is found to have very remarkable structure properties. One such structure having a 1½" wide ribs of ⅛" thickness and columns of a maximum cross section of ⅛" and having about ¼" separation between adjacent turns of each winding readily carried a load of 45 lbs. applied at the center of an 18" span with the structure supported at both ends. The entire structure in this example weighed less than 2 ounces. Again it is noted that this example is not intended to be exemplary of the invention itself, but merely to provide an indication of the remarkable results attainable herewith.

Naturally, the material and size of the individual components of the present structure are chosen in accordance with the design loading of the resultant structure. It will be appreciated that the greater the amount of tension windings provided, the greater strength that will be achieved. Further with regard to these windings, it is noted that when the structure is under load, the windings share the tension skin loads in varying degrees from an equal sharing to an extreme condition of one winding carrying the entire tension load. In circumstance wherein a torsion load is applied to the structure, it will be appreciated that only one winding spiraling in a particular direction opposing the load will be placed in tension, and the winding spiraling in the other direction would be compression loaded except for the fact that it is flexible and, thus, merely relaxes slightly. It is furthermore to be understood that substantially all loading applied to the structure of the present invention is resolved into tension and compression forces applied to the separate elements of the structure. Not only are the applied forces resolved into compression and tension forces, but, also, they are applied to particular elements of the invention designed to accommodate these loads without failure. It is not, however, intended to state that no possible deflection of a present structure is possible; however, by properly designing an individual structure for a particular application, deflection is minimized to remain less than the elastic limit of the element deflected so that the structure does not fail.

It is, of course, to be appreciated that the present invention may be constructed in a variety of different configurations within the basic limitations set forth above. Primarily, the invention comprises a plurality of constrained, or captive, columns with a compression core contacting these columns over the length thereof and a tension skin about the columns and affixed thereto firmly. There is illustrated in FIGURE 3 a four-sided structure in accordance with the present invention, and it will be seen by reference thereto that there are included four longitudinal columns 21 which are fixed relative to each other by an internal compression core 22 having four ribs 23 with one engaging each of the columns along the inner longitudinal side thereof, and a tension skin 24 about the columns. This skin 24 is formed of oppositely wound filaments 26 and 27, and in FIGURE 3 these windings are shown to be separated in the interest of illustrating the direction of windings. This structure, as shown in FIGURE 3, operates in the same manner as that shown in FIGURES 1 and 2, in that the columns 21 are fully constrained against movement relative to each other so that they cannot buckle under either compression or tension. The ribs of the core are subjected substantially only to compression forces applied from the columns thereto and transmitted between ribs at the joinder of the ribs. Such forces transmitted from one rib to another will thus be seen to apply forces to other columns that, in turn, are taken up by the tension winding, or skin 24. Thus the individual components of the structure are subjected substantially only to tension or compression forces.

It is to be appreciated that the structure of the compression core may be varied somewhat from that illustrated and described above. Thus, for example, there is shown in FIGURE 4 a two-dimension-column structure that may be advantageously employed as a rib of a compression core in the present invention. Referring to this figure, there will be seen to be provided two longitudinal columns, or the like, spaced apart by a compression plate 33. This plate engages the inner side of each of the columns 31 and 32 over the entire length thereof, and is primarily designed to withstand compression forces applied thereto through the columns. About this column and plate structure there is provided a tension skin 34 formed of two oppositely wound filamentary windings 36 and 37 which are firmly secured to the columns in passage thereover. This particular structure, as illustrated in FIGURE 4 and described above, will be seen to have a very substantial strength except insofar as torsion or bending of the unit are concerned. For certain applications these types of forces are not experienced, and consequently the unit is highly desirable for such applications, as, for example, ribs in the compression core of the captive-column structure described above.

It is also possible, with regard to the compression-core structure, to provide an opening through the center thereof, as may be required for many applications of structural elements. Such a configuration of the present invention is illustrated in FIGURE 5 wherein a tube 41 is shown to extend through the center of a structure having a number of columns 42 maintained in fixed relation to the tube by means of ribs 43 and an outer tension skin 44 formed in the same manner as described above. In this instance, the ribs of the compression core are directed toward each other radially inward of the structure as shown in FIGURE 5, but do not actually intersect because of the tube 41 engaging the inner edges of the ribs. It is necessary in this type of structure to provide means for preventing relative movement between the ribs and tube of the core, and this may be accomplished by tension windings 46 extending, for example, about two of the columns and engaging the tube on opposite sides thereof. A captive-column structure formed as illustrated in FIGURE 5 is desirable for applications wherein it is necessary to have open passage through the center of the structure. The interior of the compression-core tube 41 may thus be employed as a conduit for the extension of piping, wiring or the passage of fluids. This general type of structure may even be employed as a portion of an aircraft fuselage, for example, wherein the tube 41 comprises the shroud of a jet engine.

Innumerable applications of the present invention are possible. The invention may, as described, be constructed to comprise individual structural elements that may be utilized in combination for the fabrication of larger units. Thus, the captive-column structure of the present invention is highly advantageous for use as beams, columns and the like. Alternatively, the captive-column structure of the present invention may comprise a complete unit of manufacture, such as, for example, a foot bridge, a pontoon, a tower and many other possible structures. It is, of course, not necessary for the captive-column structure of the present invention to have a uniform cross section over the length thereof. For many applications, it is desirable to taper the structure, as illustrated, for example, at 51 of FIGURE 6. The columns of the structure may actually come together to form a point at one or both ends of the overall structure. In this case, of course, the width of the ribs of the compression core vary along the structure, again as generally indicated in FIGURE 6. A variety of applications is possible for this configuration of the present invention, such as, for example, towers, boat hulls and the like. It is not intended herein to indicate that the captive-column structure need have any particular dimensions, for it is possible to build a structure in accordance with the invention having substantially any desired dimensions. Single units of 60' to 100' in length are quite readily manufactured and exhibit very remarkable strength-to-weight ratios. A 60' unit, formed in accordance with the present invention and having the configuration of the unit in FIGURE 6, may be readily supported at the points thereof without any noticeable sagging or deflection between ends, and yet be fully waterproofed and, in fact, air tight.

It is also be noted that the captive-column structure of the present invention is equally advantageous in circumstances wherein the loads are internally applied. Thus, for example, the present invention may be employed as a container wherein the column within the tension skin is filled with any desired materials to be transported, for example. Application of forces outwardly upon the tension skin results in substantially the same resolution of forces in the components of the structure as externally applied forces.

As briefly noted above, the columns of the structure of this invention are preferably bonded to the compression core; however, this is not essential for all applications. It should furthermore be noted that when the columns are bonded to the compression core allowance should be made for contraction and expansion of the column elements under load without damage to the compression core. This may be best appreciated by considering a structure such as generally illustrated in FIGURE 1, for example, wherein a substantial load is applied upon an upper column 11 when the unit is supported between ends of the structure, for under this condition the upper column will undergo compression while the lower columns will be under tension. This results from a tendency of the structure to deflect, and consequently any individual structure is preferably designed as to individual components thereof for maximum strength under known loading conditions.

There has been described above a captive-column structure in terms of particular preferred embodiments thereof; however, it is to be appreciated that many variations are possible in the structure. It is basic to the invention that the columns themselves shall be constrained against any substantial movement relative to each other and this is accomplished by the provision of an inner-compression core and outer-tension skin, both engaging the columns. In order to construct a three-dimensional captive-column structure, it is necessary to employ at least three columns. It is, of course, not necessary that the intersection of the ribs of the compression core occur at the center of the structure, although the most efficient transfer of forces between the ribs is achieved when the intersection is so located. It is also not necessary that the ribs of the compression core be formed as illustrated. There may, for example, be utilized a plurality of tubes disposed side-by-side and extending inwardly from the columns to an intersection with the other ribs so formed. Likewise, it is possible to employ corrugated sheets as the ribs, inasmuch as it is known that such units have quite high compressive strength longitudinally of the corrugations. For particular applications of the present invention it is even possible to design the compression core in such a way that it can flex and snap back into original configuration in order to allow the overall structure to absorb impact at its skin or edges. The core may also include a central element at the joinder of the ribs or core material. Such a central element may have a high transverse compression strength to improve transfer of force between the radial core material such as the ribs and, being fully constrained, may also be employed as a column of the overall structure in the same manner as the columns outside the core. Further, the core ribs and columns may, of course, be integrally formed, as, for example, by flattening outer rib edges to form columns.

All of the foregoing possibilities and many others lie within the general scope of the present invention. Consequently, reference is made to the appended claims for a precise delineation of the true scope of the invention.

That which is claimed is:

1. A captive-column structure comprising a plurality of thin elongated columns, a compression core between the columns in engagement with each of said columns over the length of each and joined together at the center thereof for the transfer of forces between portions thereof with said core having a high compression strength inwardly thereof to prevent said columns from moving toward each other, and a tension skin about said columns and core in engagement only with said columns and including oppositely wound helical windings of high tensile filament attached in tension to the columns to prevent said columns from moving away from each other whereby said columns are fully constrained from relative motion.

2. The structure of claim 1 further defined by the windings of said tension skin being formed of flexible high-tensile-strength material joined to said columns in tension.

3. The structure of claim 1 further defined by said compression core including a central tube with ribs extending radially therefrom to each of the columns, and additional tension windings about said tube and at least two columns.

4. The structure of claim 1 further defined by said columns comprising at least three columns disposed in parallel relation, said compression core comprising the same number of ribs as there are columns with the ribs being rectangular and extending outwardly from mutual engagement into separate engagement with individual columns, and said tension skin covering all of said columns with a smaller pitch angle at the ends of the structure than over the remainder of the length.

5. A captive-column structure comprising a plurality of at least three thin and narrow elongated columns extending longitudinally of the structure and spaced apart over at least the majority of the length of the structure, said columns having a substantial strength in compression and tension, a compression core disposed between said columns and including a radial rib for each column and engaging the column over substantially the entire length thereof, said core ribs being connected at the core center for transfer of compression forces therebetween and said core having a high compression strength to prevent said columns from moving inwardly of the structure, and a tension skin including oppositely wound high tensile filaments extending in tension about the columns and core in engagement only with the columns and affixed to the columns for restraining said columns from moving away from the core and each other whereby said columns are fully constrained from movement relative to each other and said cores so that the columns experience substantially only compression and tension when whatever type of loading be applied to the structure.

6. The captive-column structure of claim 1 further defined by the windings of said tension skin having a pitch in the range of 30° to 60°.

7. The structure of claim 6 further defined by the pitch of said windings being substantially 45°.

8. The captive-column structure of claim 1 further defined by said core comprising a plurality of elongated ribs with one rib engaging each column along the length thereof and said ribs being joined together along a common joinder line.

9. The structure of claim 8 further defined by the ribs of said compression core including at least one longitudinal column along the inner rib edge with a compression plate extending therefrom and a pair of oppositely wound high-tension windings about the rib and engaged column.

10. The structure of claim 8 in which there are at least three columns and said core includes at least three ribs extending from a common joinder with substantially equal angles between ribs of the core.

11. The structure of claim 10 in which there is an uneven number of columns and ribs and each of the core ribs has a V-shaped inner edge for abutment with the other ribs along a common joinder whereat said ribs are affixed together.

References Cited

UNITED STATES PATENTS

| 297,331 | 4/1884 | Adams | 52—730 |
| 1,293,208 | 2/1919 | Ryan | 52—84 |
| 1,798,064 | 3/1931 | Chorlton et al. | 52—653 |
| 2,516,020 | 7/1950 | Reed | 52—730 |
| 2,737,266 | 3/1956 | Gross | 52—280 |

FOREIGN PATENTS

| 2,061 | 8/1860 | Great Britain. |
| 127,665 | 6/1919 | Great Britain. |

HENRY C. SUTHERLAND, Primary Examiner

J. L. RIDGILL, Jr., Assistant Examiner

U.S. Cl. X.R.

52—653, 730